C. J. WIDMER.
AUTOMOBILE MOTOR STARTER.
APPLICATION FILED AUG. 16, 1911.
1,051,976.
Patented Feb. 4, 1913.
4 SHEETS—SHEET 1.
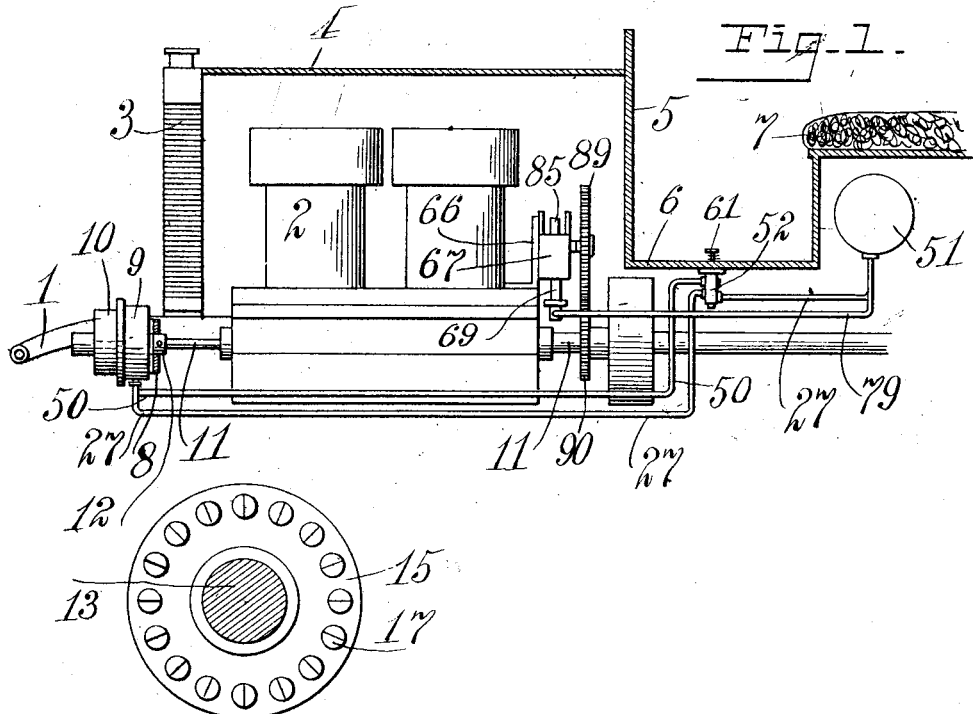
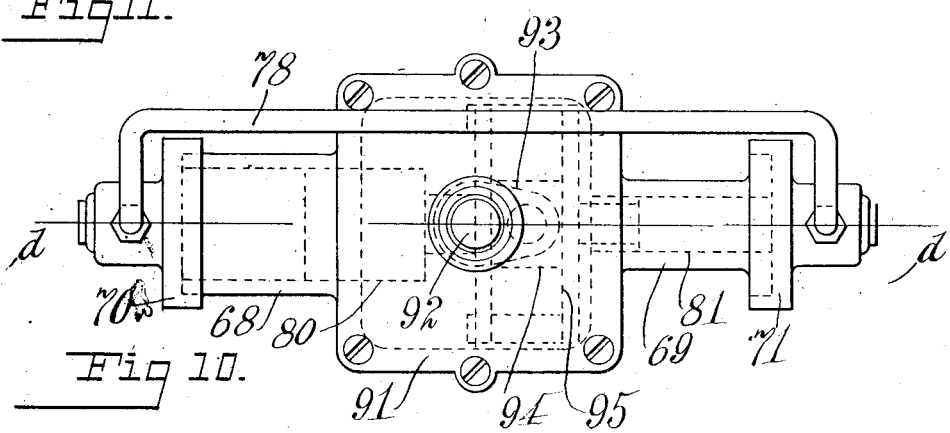
Inventor
Charles J. Widmer.
Witnesses
By
his Attorney C. J. WIDMER.
AUTOMOBILE MOTOR STARTER.
APPLICATION FILED AUG. 16, 1911.
1,051,976.
Patented Feb. 4, 1913.
4 SHEETS—SHEET 2.
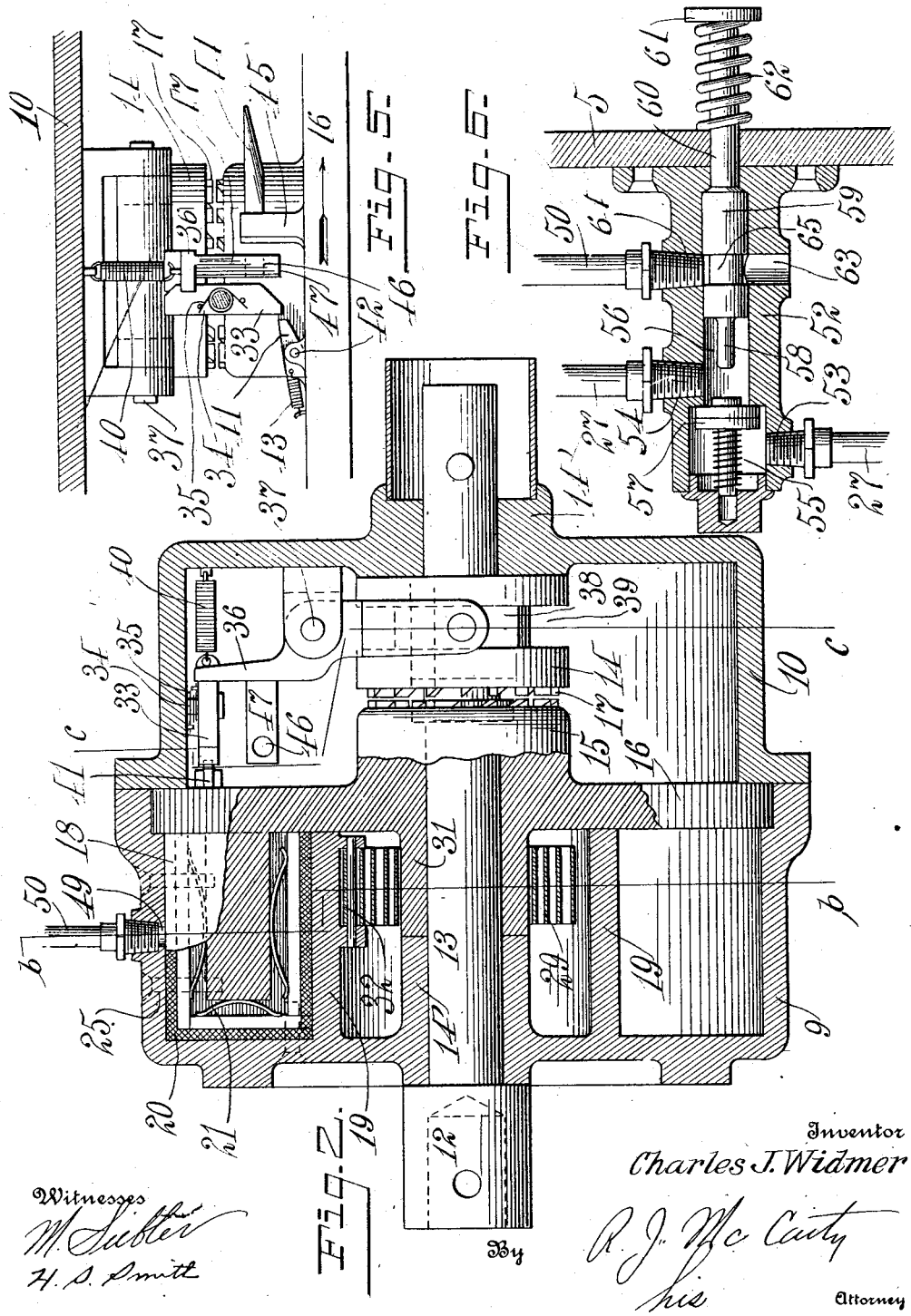
Witnesses
M. Liebler
H. S. Smith
Inventor
Charles J. Widmer
By R. J. McCarty
his Attorney

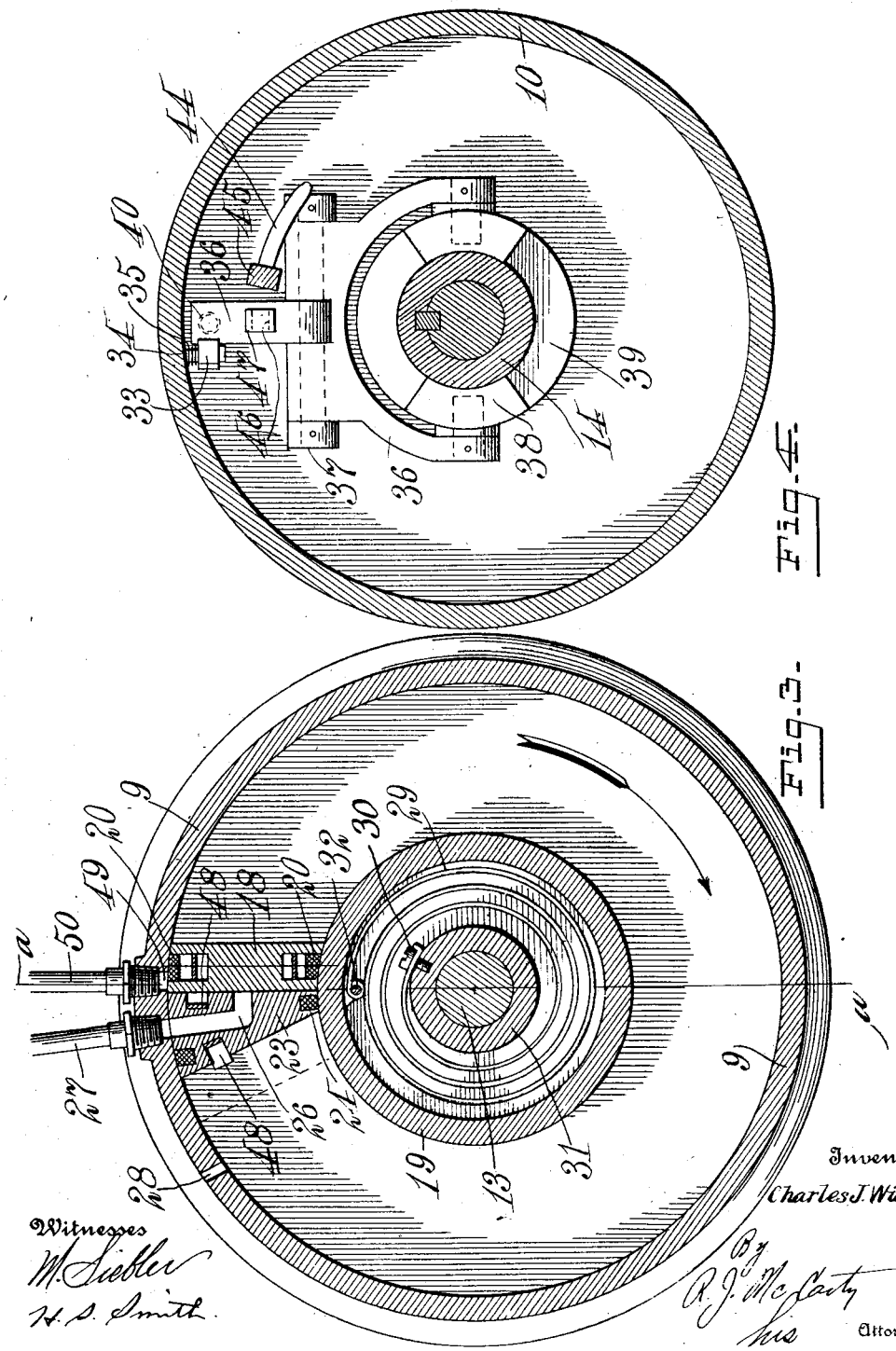

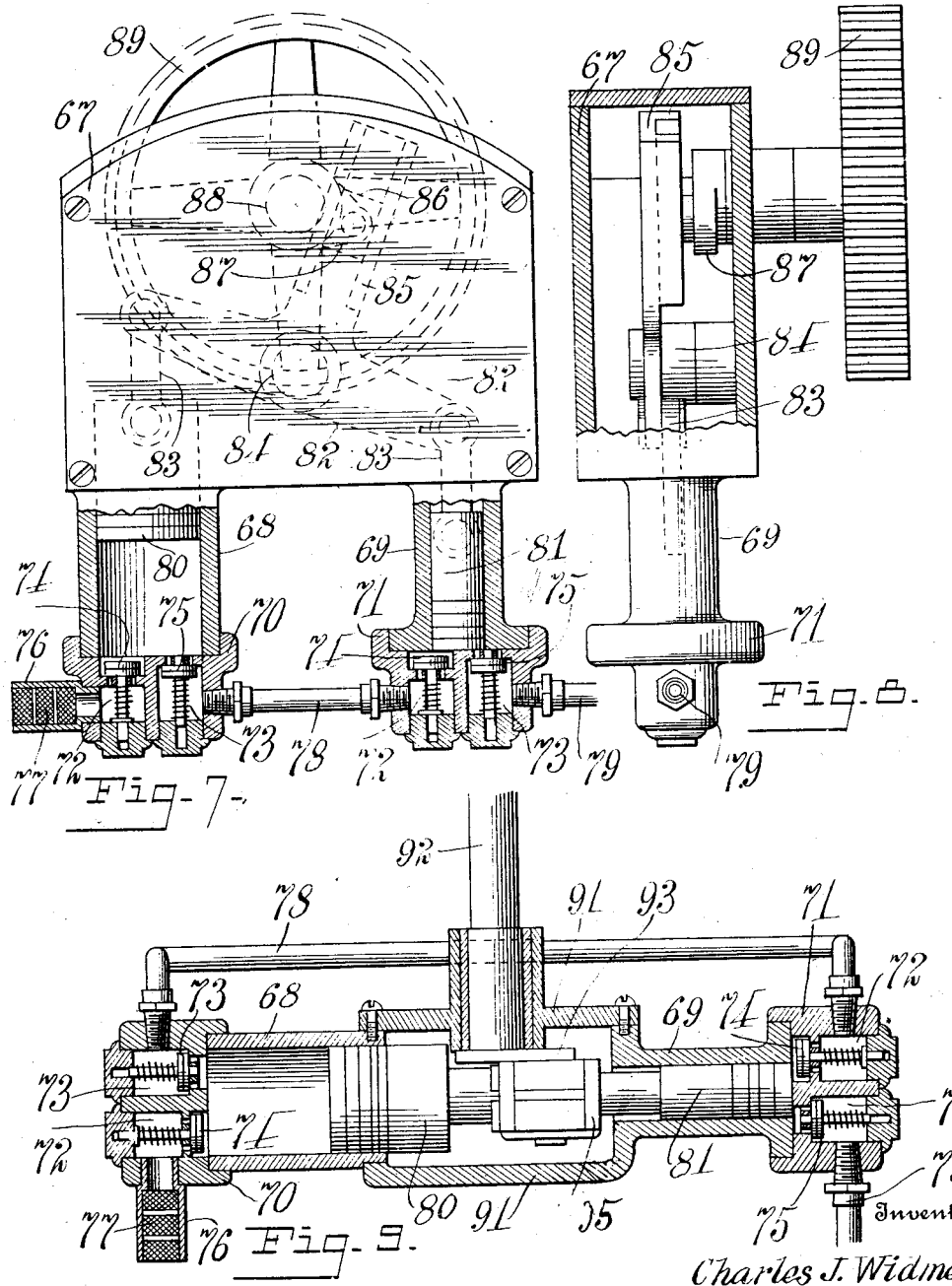

UNITED STATES PATENT OFFICE.

CHARLES J. WIDMER, OF FRANKLIN, PENNSYLVANIA.

AUTOMOBILE MOTOR-STARTER.

1,051,976.　　　　Specification of Letters Patent.　　Patented Feb. 4, 1913.

Application filed August 16, 1911.　Serial No. 644,363.

*To all whom it may concern:*

Be it known that I, CHARLES J. WIDMER, a citizen of the United States, residing at Franklin, in the county of Venango and State of Pennsylvania, have invented certain new and useful Improvements in Automobile Motor-Starters; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in automobile motor starters of the type in which a compressed medium such as air, is used as a driving means.

The object of the invention is to provide a device of this type which may be attached to any automobile without detracting from its appearance or adding unnecessarily to its weight, and which will positively start the automobile motor with a minimum amount of effort on the part of the automobilist.

To the above ends the device is simple and durable in construction, and consists in certain details of form, combination and arrangement, all of which will be more fully described in the following specification and particularly pointed out in the claims.

Referring to the drawings, Figure 1 is a vertical, longitudinal view through the forward part of an automobile showing my invention applied thereto; Fig. 2 is a vertical longitudinal sectional view through the starter proper on the line *a—a* of Fig. 3; Fig. 3 is a section on the line *b—b* of Fig. 2; Fig. 4 is a section on the line *c—c* of Fig. 2; Fig. 5 is a top plan view of the clutch and its operating devices; Fig. 6 is a vertical longitudinal sectional view through the controlling valve; Fig. 7 is a front elevation, partially in section, of the air compressor; Fig. 8 is a side elevation of the same; Fig. 9 is a longitudinal sectional view on the line *d—d* of Fig. 10, showing a modified form of air compressor; Fig. 10 is a front elevation of the same; and Fig. 11 is a detail view of one of the clutch members.

Referring in detail to the drawings, and particularly to Fig. 1, 1 represents the frame on which a motor 2 of an automobile is mounted, 3 represents the radiator, 4 the hood, 5 the dash board, 6 the floor and 7 the seat. These various elements are well known parts of an automobile, to any type of which my invention may be applied. Attached to the frames 1 at the forward end of the machine is a bracket 8 which supports the starter. The mechanism thereof is inclosed within a housing 10 and a cylinder 9 secured to the bracket 8. The shaft 11 of the engine 2 is attached, by means of a coupling 12, to a shaft 13 journaled in bearings 14' in the cylinder 9 and the housing 10. Splined to the shaft 13, and lying within the housing 10, is a clutch member 14 which coöperates with a similar clutch member 15 on a piston disk 16. The clutch members 14 and 15 may be of any well known type, or may be constructed with engaging pins 17 which are chamfered on their outer ends as is shown in the drawings. The piston disk 16 is freely journaled on the shaft 13, and the periphery thereof has a bearing in the cylinder 9. Attached to the piston disk 16 is an oscillating piston 18 which lies between an inner cylinder 19 and the outer cylinder 9. The piston 18 is provided with packing 20 pressed against the cylinders 9 and 19 by means of springs 21. The piston 18 oscillates in the cylinder 9 and within said cylinder is a rigid division wall 23 which may be provided with packing 24, and secured in position by screws 25. The wall 23 is provided with a port 26 which is connected with a source of compressed air or gas by a tube 27. When the compressed gas is caused to enter the port 26, it expends its energy against the piston 18, thereby driving said piston in the direction of the arrow until it reaches the position shown in dotted lines in Fig. 3, when the force of the gas is expended through exhaust openings 28 in the cylinder 9. The piston 18 is returned to its normal position, or that shown in full lines in Fig. 3, by a spiral spring 29, the inner end 30 of which is attached to a hub 31 on the piston disk 16, and the other end 32 of which is attached to the inner side of the inner cylinder 19. The spring 29 is wound up during the movement of the piston in the direction of the arrow, and is unwound when the piston is returning. The movement of the piston 18 in either direction is arrested by bumper springs 48 attached to the wall 23. During the return movement of the piston, the gas in the front thereof escapes through a port 49 connected with a tube 50, which is controlled by a valve, hereinafter to be described, to close said opening during the power or forward stroke of the piston. The clutch member 14 is normally held out of engagement with the member 15 by a latch 33 pivoted at 34 and partially controlled by a spring 35. The latch 33 is in engagement with the upper end of a lever 36 pivoted at 37, and the lower end of which is bifurcated and provided with shoes 38 which ride in a groove 39 in the clutch member 14. Attached to the upper end of the lever 36 is a spring 40 which throws the clutch member 14 in engagement with the member 15 when the latch 33 releases the lever 36. The latch 33 is actuated to release the lever 36 during the initial movement of the piston by a catch 41. The catch 41 is pivoted at 42 to the piston disk 16, and is partially controlled by a spring 43 which allows the catch to pass the latch when the piston is returning to a normal position. When the piston has completed its forward movement, or that indicated by the arrow in Fig. 3, the clutch members 14 and 15 are disengaged by a cam 44 mounted on an arm 45 extending from the piston disk 16. The cam 44 is adapted to engage a recess 46 in an arm 47 extending from the lever 36 to move said lever against the tension of the spring 40 and to disengage the clutch.

The source of compressed gas consists of a tank 51 which may be located beneath the seat 7 of or at any other convenient point on the automobile. The tank 51 is connected with the port 26 in the wall 23 by the tube 27 before referred to. Connected into the tube and controlling the passage of the gas from the tank 51 to the starter, is a controlling valve constructed as follows: Mounted below the floor 6 of the automobile, or at any other point such as the dash-board 5, is a valve housing 52, shown in detail in Fig. 6. This housing may be placed vertically or horizontally, and is provided with ports 53 and 54 which receive adjacent ends of the tube 27. The port 53 enters a chamber 55, while the port 54 enters a chamber 56. The chambers 55 and 56 are separated by a valve 57 adapted to be opened by a projection 58 on a piston valve 59. Attached to the valve 59 is a stem 60 which extends out through the floor 6, or dash board 5, and is provided with a head 61. Surrounding the stem 60 is a spring 62 which normally holds the projection 58 out of engagement with the valve 57. The head 61 is adapted to be depressed or actuated by the foot of the automobilist, and when so actuated, the projection 58 opens the valve 57 and permits the compressed gas to pass from the tank 51 to the starter, and thereby actuate the piston 18. The valve housing 52 is also provided with a port 63, which communicates directly with the atmosphere, and a port 64 in alinement with the port 63. The port 64 is connected with the port 49 in the cylinder 9 by the tube 50 before referred to. The piston valve 59 controls the ports 63 and 64, and is provided with a groove 65 which allows the gas or air in front of the returning piston to escape through the port 49, tube 50 and ports 63 and 64. When the gas is thus escaping, the valve 59 is in a normal position, but when said valve is actuated to open the valve 57, the openings 63 and 64 are closed by said piston valve 59, thereby preventing the compressed gas which is entering the cylinder 9 through the port 26 from escaping through the tube 50. When the piston has reached the end of its forward movement and the motor has been started, the operator releases the valve 59, and the spring 62 returns said valve to a normal position, thereby opening the ports 63 and 64 and permitting the gas on the forward side of the returning piston to escape to the atmosphere.

The compressed air or gas may be supplied to the tank 51 by an outside source, or from a compressor carried by the automobile, and which may be constructed as follows: Attached to the base of the motor 2 is a bracket 66 which is secured to a casing 67 of an air compressor shown in detail in Figs. 7 and 8. Depending from the casing 67 is a low pressure cylinder 68 and a high pressure cylinder 69. The cylinders 68 and 69 are provided with valve housings 70 and 71 respectively. The housings 68 and 69 are provided with inlet and exhaust chambers 72 and 73 which coöperate with inlet and exhaust valves 74 and 75. The inlet chamber 72 of the low pressure cylinder communicates with an air inlet 76 provided with a multiplicity of air screens 77. The exhaust chamber 73 of the low pressure cylinder communicates with the inlet chamber of the high pressure cylinder through a tube 78. The exhaust chamber 73 of the high pressure cylinder communicates with the tank 51 through a tube 79. The air is first compressed in the low pressure cylinder and then in the high pressure cylinder before being delivered to the tank 51, which insures sufficient pressure being accumulated to operate the starter. Reciprocating in the cylinders 68 and 69 are pistons 80 and 81 respectively, which are connected to a walking beam 82 by links 83. The beam 82 is pivoted at 84 and is provided with a slotted arm 85 which receives a sliding block 86 on a crank 87. The crank 87 is mounted on a shaft 88 journaled in the casing 67 and provided with a gear 89. The gear 89 is in mesh with a gear 90 on the shaft 11 of the automobile motor, and by means of which the compressor is driven.

In lieu of the air compressor above described, a compressor shown in Figs. 9 and 10 may be substituted. In this construction the low and high pressure cylinders 68 and 69 are mounted in axial alinement, and extend from opposite sides of a casing 91. Journaled in the casing 91 is a shaft 92 provided with a crank 93 which carries a sliding block 94. The block 94 reciprocates in a cross head 95 to which the pistons 80 and 81 are attached. The cylinders 68 and 69 in this construction are provided with valve housings 70 and 71 similar to the valve housings in the construction shown in Figs. 7 and 8.

The operation of the device is as follows: With the parts in the position shown in the drawings, the tank 51 has been supplied with compressed air from the air compressor or from outside sources, and when it is desired to start the motor 2, the automobilist places his foot on the head 61, which opens the valve 57 and allows the compressed air to pass through the tube 27, and through the port 26, into the cylinder 9 where it exerts itself against the piston 18. During the initial movement of the piston the catch 41 releases the latch 33, and the spring 40 shifts the clutch member 14 into engagement with the member 15. During the continued movement of the piston 18, the shaft 11 of the automobile motor will be rotated sufficiently to start the same. Also during the continued movement of the piston, the spring 29 is wound up and when the piston reaches the end of its movement or the position shown in dotted lines in Fig. 3, the piston will stop, as the compressed gas will escape through the exhaust ports 28. When the piston reaches the end of its movement, the cam 44 engages the orifice 46 in the arm 47 and actuates the lever 36 to disengage the clutch members 14 and 15, thereby preventing the momentum of the moving parts of the automobile motor being communicated to the piston 18. While the piston 18 is moving forward, the compressed air in the cylinder 9 is prevented from escaping through the tube 50 by the piston valve 59, and when the piston has finished its forward movement, the automobilist releases the head 61, which allows the valve 57 to close, and the ports 63 and 64 to open, which permits the air to escape from in front of the returning piston. The piston is then returned to its normal position by the spring 29, and is then in a position for the operation to be repeated.

Without limiting myself to the precise arrangement shown and described, which may be varied within the scope of the claims, I claim:

1. In a device of the type specified, a motor and the shaft thereof, an oscillating piston operatively connected to said shaft, a cylinder in which said piston is mounted, a clutch controlling said operative connection, and means controlled by said piston and adapted to throw in said clutch during the initial movement of said piston, and means carried by said piston to throw out said clutch at the end of the movement of the piston, and means for supplying compressed gas to said cylinder to drive said piston and to start said motor.

2. In a device of the type specified, a motor and the shaft thereof, an oscillating piston operatively connected to said shaft, a cylinder in which said piston is mounted, a clutch controlling said operative connection, a lever adapted to actuate said clutch, a spring partially controlling said lever, a latch adapted to engage said lever and to hold said clutch in a disengaged position, a catch carried by said piston and adapted to engage the latch to permit the spring to set the clutch, and a cam carried by said piston and adapted to unseat said clutch, and means for supplying compressed gas to said cylinder to actuate said piston and to start said motor.

3. In a device of the type specified, a motor and the shaft thereof, an oscillating piston operatively connected to said shaft, a clutch controlling said operative relation, a lever adapted to actuate said clutch, a spring connected to said lever and adapted to set said clutch, a latch adapted to engage said lever and to hold said clutch in an opened position, a catch carried by the piston and adapted to engage said latch to set the clutch during the initial movement of the piston, a cam carried by said piston and adapted to engage said lever to unset the clutch at the end of the movement of the piston, a cylinder in which said piston is mounted, means for supplying compressed gas to said cylinder to move said piston in one direction to start the motor, and a spiral spring attached to said piston and adapted to move said piston in the opposite direction.

In testimony whereof I affix my signature, in presence of two witnesses.

CHARLES J. WIDMER.

Witnesses:
C. B. A. LANGE,
PETER EMMICKE.